(12) United States Patent
Becker et al.

(10) Patent No.: US 6,817,856 B2
(45) Date of Patent: Nov. 16, 2004

(54) CALENDER INSTALLATION

(75) Inventors: Rupert Becker, Vöcklabruck (AT); Bruno Haider, Gmunden (AT)

(73) Assignee: SML Maschinengesellschaft m.b.H., Lenzing (AT)

( * ) Notice: Subject to any disclaimer, the term of this patent is extended or adjusted under 35 U.S.C. 154(b) by 275 days.

(21) Appl. No.: 10/212,154

(22) Filed: Aug. 6, 2002

(65) Prior Publication Data

US 2003/0031748 A1 Feb. 13, 2003

(30) Foreign Application Priority Data

Aug. 7, 2001 (EP) .............................................. 01890228

(51) Int. Cl.$^7$ .......................... B29C 43/48; B29C 47/88
(52) U.S. Cl. ...................... 425/186; 29/426.1; 425/193; 425/194; 425/373
(58) Field of Search ................................ 425/186, 193, 425/194, 373; 29/426.1

(56) References Cited

U.S. PATENT DOCUMENTS

| | | | |
|---|---|---|---|
| 4,726,871 A | * | 2/1988 | Husges et al. ............... 425/194 |
| 4,932,855 A | * | 6/1990 | Gersbeck et al. ........... 425/193 |
| 5,100,312 A | * | 3/1992 | Wiener ........................ 425/194 |
| 5,674,442 A | | 10/1997 | Morita .................... 264/178 R |
| 6,077,065 A | | 6/2000 | Sumiyoshi et al. ......... 425/368 |
| 6,463,648 B2 | * | 10/2002 | Gottling et al. ............ 29/426.1 |

FOREIGN PATENT DOCUMENTS

| | | |
|---|---|---|
| EP | 0 838 321 | 4/1998 |
| WO | WO 99/12722 | 3/1999 |

* cited by examiner

*Primary Examiner*—James P. Mackey
(74) *Attorney, Agent, or Firm*—Steptoe & Johnson LLP; D. Douglas Price

(57) ABSTRACT

Device (1) for use in a roll frame (10) for the manufacture of a plastics film, having a continuous band (2), looped around at least two deflection rolls (3, 3'), for pressing the plastics film against a roll (9) of the roll frame (10), the two deflection rolls (3) being rotatably mounted on both sides in lateral bearing devices (5, 5') and fastening means are provided for fixing the deflection rolls (3, 3') in a bearing device (5) and the other bearing device (5') is pivotably mounted for the exchange of the continuous band (2); and a process for changing a continuous band (2) for pressing a plastics film against a roll (9) and for cooling the same, which is looped at least around two deflection rolls (3) rotatably mounted in lateral bearing devices (5, 5'), the deflection rolls (3, 3') being fixed in a bearing device (5). Fastening means of the other bearing device (5') are released and the other bearing device (5') is pivoted.

18 Claims, 3 Drawing Sheets

CALENDER INSTALLATION

The invention relates to a device for use in a roll frame for the manufacture of a plastics film, having a continuous band, looped around at least two deflection rolls, for pressing the plastics film against a roll of the roll frame and for cooling the same, the two deflection rolls being rotatably mounted on both sides in lateral bearing devices. The invention further relates to a process for changing a continuous band for pressing a plastics film against a roll and for cooling the same, which is looped at least around two deflection rolls rotatably mounted in lateral bearing devices.

In addition to the contact-pressing and cooling of the plastics film, the continuous band, which is generally realized as a continuous metal band, can also be used to transmit the surface of the continuous band to the plastics film.

Such a device is known, far example, from U.S. Pat. No. 6,077,065 and is especially used, in calenders, having two chill rolls, for contact-pressing the plastics film introduced via a nozzle, since relatively thin plastics films with a relatively smooth or structured surface can thereby be manufactured in a simple manner. As alternatives to the continuous band (also referred to as "sleeve band"), air knives or even contact-pressing rolls are normally used. Yet the continuous band, especially in respect of plastics films (for example polypropylene films, etc.) with a thickness of between 50 and 500 µm, does have advantages.

Continuous bands of this type, generally consisting of metal, have a relatively short working life, however, and generally have to be exchanged after a few weeks due to wear phenomena, especially cracks in the marginal region. The exchange of the continuous band is complicated, however, since, in known devices, the bearing housings of the roller bearings provided for the rotatable mounting of the deflection rolls have to be opened. Consequently, substantial downtimes are suffered due to the band change.

The object of the present invention is now to create a device of the type stated in the introduction, in which the continuous band can be quickly and easily exchanged and the downtimes of the roll frame are thereby reduced. In addition, a process of the type stated in the introduction is intended to be created for the same purpose.

This object is achieved with the aid of a device of the type stated in the introduction, in which fastening means are provided for fixing the deflection rolls in a bearing device and the other bearing device is pivotably mounted for the exchange of the continuous band. Such a device allows the deflection rolls to thus initially be attached to a bearing device and it is subsequently possible to pivot the other bearing device for the exchange of the continuous band, whilst the deflection rolls are held with freely projecting ends in the other bearing devices. Once the continuous band has been exchanged, the previously pivoted bearing device is swiveled back and the fastening means for fixing the deflection rolls in the other bearing device are re-released. This produces an exchange of the continuous band which is made substantially simpler compared to known devices. Consequently, the downtimes of the roll frame in which such a device is provided are able to be substantially reduced.

If, as the fastening means for fixing the deflection rolls, a fixing ring having a wedge surface is respectively provided, the deflection rolls can be fixed by simple displacement of the fixing rings in the direction of a bearing housing surrounding the bearings of the deflection roll, since a frictional connection is formed between the wedge surface of the fixing ring and the bearing housing of the deflection roll.

To avoid contact, when the bearing device is pivoted, with liquid-carrying lines which are provided, where appropriate, and are connected to the deflection rolls, for example for the chilling thereof, it is favorable if the fixing rings are provided on a side of the device which has ports for a liquid or gaseous medium, especially a cooling medium.

If the bearing device is mounted pivotably about an essentially vertical rotational axis, the bearing device can be laterally pivoted in a simple manner about a, in the fastened position, vertical rotational axis, allowing the continuous band to be exchanged without hindrance. In particular, it is herein favorable if the bearing device is mounted such that it can be pivoted about 90°, since unhindered access to the deflection rolls fastened in the other bearing device is thereby guaranteed, even where the continuous bands are very wide. The pivoting can also, however, be effected over another range of angle.

A constructively particularly simple design of the pivotable arrangement of a bearing device for the exchange of the continuous band is obtained if, for the pivotable mounting, a centering bolt jutting downwards from the bearing device is provided, which centering bolt is rotatably arranged in a corresponding opening in a receiving plate.

In order to be able to connect the device in modular fashion to a roll frame, it is advantageous if the device is provided on a trolley having a plurality of wheels.

If the pivotable bearing device has conical recesses for receiving conical bearing housings of the deflection rolls, the bearing sleeves of the rolls can easily be inserted into the recesses in the pivotable bearing device and additionally, due to the conical design of both recess and bearing housing, a self-centering of the positive and/or non-positive connection is obtained.

In order to be able to adjust the tension of the continuous band and, in particular, to reduce the tension of the continuous band prior to the band change, it is advantageous if at least one deflection roll is arranged adjustably in the bearing devices. In particular, it is herein advantageous if a pneumatic or hydraulic cylinder is provided for the adjustment of the roll position.

As an alternative thereto, an electric motor with spindle gearing can also be used to adjust the roll position.

For the exact alignment of the continuous band relative to the roll against which the plastics film to be manufactured is pressed, it is favorable if a stand supporting the two bearing devices is arranged such that it is horizontally and vertically adjustable.

At least one of the deflection rolls can be driven by a motor, for example an electric motor.

The process according to the invention, of the type stated in the introduction, is characterized in that the deflection rolls are fixed in a bearing device, fastening means of the other bearing device are released and the other bearing device is pivoted, so that the continuous band can be laterally extracted from the deflection rolls.

Using this process, the time needed to exchange a continuous band due to wear or aging phenomena, just as with the above-described device, is substantially reduced, since there are no split bearing housing shells having to be disassembled.

In order to be able particularly easily to remove the continuous band from the two deflection rolls and insert a new continuous band, it is favorable if the mutual distance between the deflection rolls is shortened before the bearing device is pivoted, since the band tension of the old band is reduced prior to removal and the continuous band does not have to be tensioned for insertion.

If the deflection rolls in the bearing device are respectively fixed by means of a fixing ring having a wedge surface, the deflection rolls can easily be rigidly fastened in a bearing device, by bracing of the wedge surfaces between the roll and the bearing housings surrounding the roll, and at the same time centered.

For a simple, easily manageable pivoting of the bearing device, which, in a pivoted position, allows unhindered access to the two fixed deflection rolls, it is advantageous if the bearing device is pivoted about an axis disposed essentially perpendicular to a receiving plate. In particular, for an unhindered change of continuous band, it is herein advantageous if the bearing device is pivoted about 90°.

The invention is explained in greater detail below with reference to a preferred illustrative embodiment represented in the drawing, but to which it is not intended to be limited, in which drawing, specifically:

Figure 1:
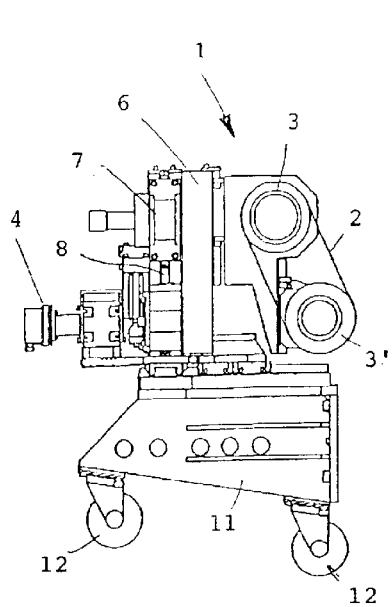
FIG. 1 shows a side view of a device for use in a roll frame having a pivotable bearing device.
Figure 2:
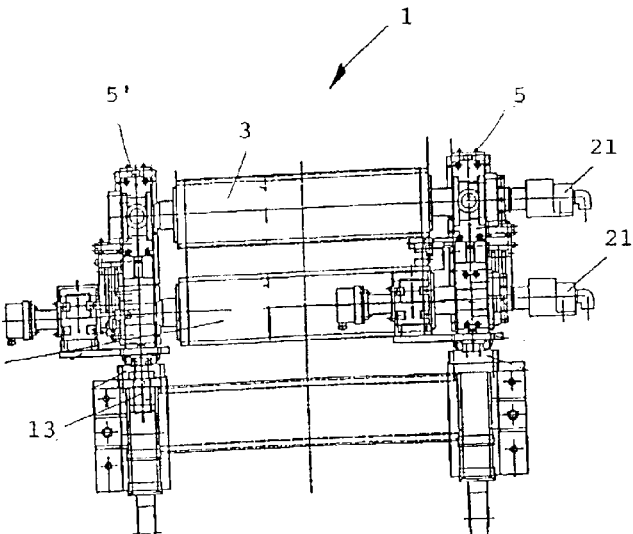
FIG. 2 shows a view of the device according to FIG. 1.

In FIGS. 1 and 2, a device 1 is shown which is used in a roll frame 10 (cf. FIG. 7) for the manufacture of plastics films for pressing the plastics film against a roll 9 and for cooling the plastics film. It can particularly be used in a calender for pressing the plastics film against a chill roll and for cooling the same. To this end, a continuous band or sleeve band 2 is provided, which is looped around two deflection rolls 3, 3'. The deflection rolls 3, 3' can be non-powered or the upper deflection roll 3 or lower deflection roll 3' can be driven by means of a motor 4. In order to increase production speed and improve film quality, both deflection rolls 3, 3' can also, however, be driven by a motor 4. The deflection rolls 3, 3' are rotatably mounted on both sides in the bearing devices 5, 5' by means of roller bearings 26 (cf. FIG. 3).

Figure 7:
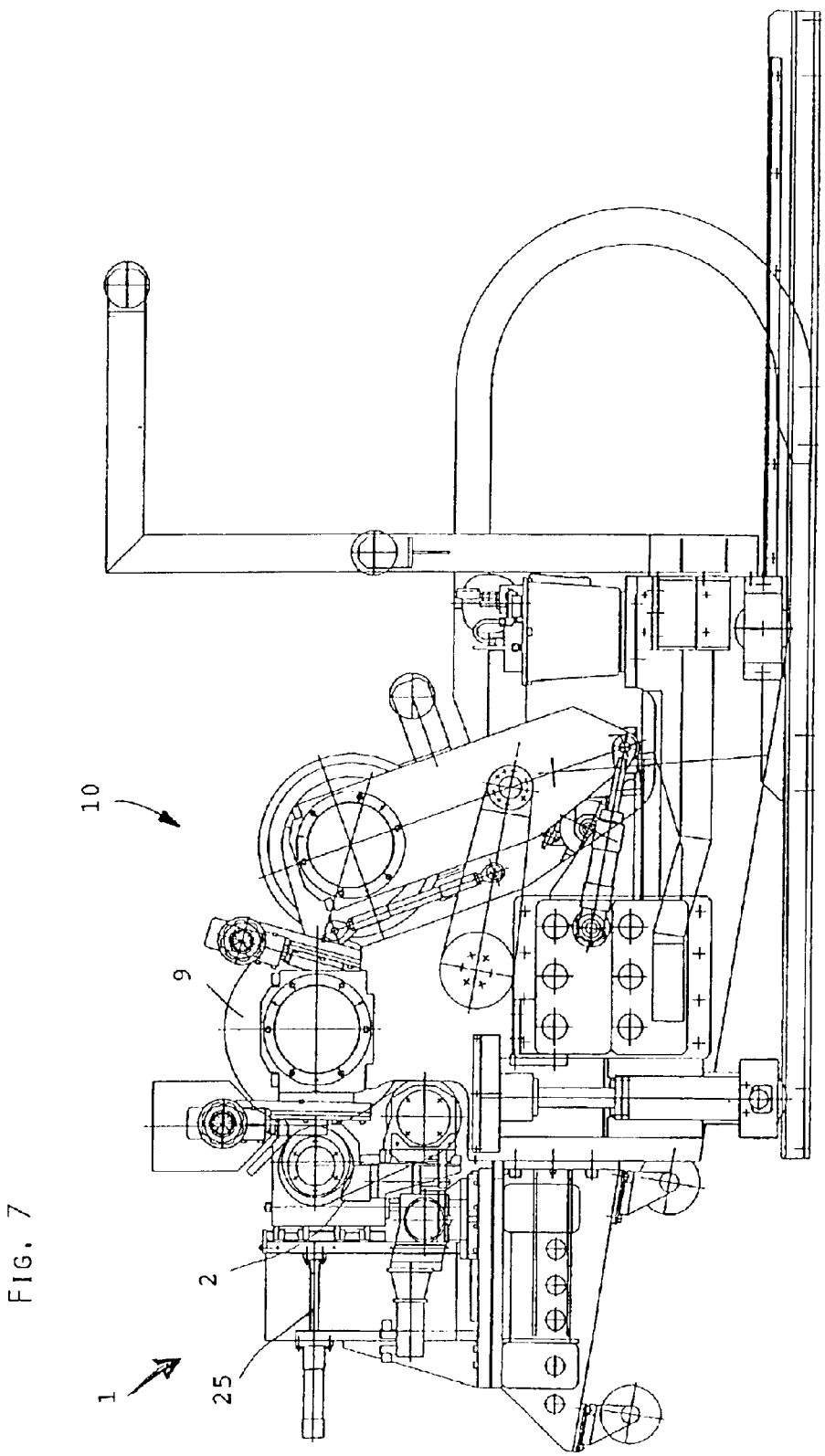
FIG. 7 shows a view of the device in a state installed in a roll frame.

The two bearing devices 5, 5' are in this case provided in a stand 6, which, by means of the cylinders 7, 8, can be horizontally or vertically displaced so as to obtain the desired alignment of the continuous band 2 relative to the roll 9 of the roll frame 10 in which the device 1 is used (cf. FIG. 7).

In order to allow the device 1 to be connected in modular fashion to the roll frame 10, it is arranged displaceably on a trolley 11 having a plurality of rollers 12.

To allow a bearing device 5 to be swiveled out of its position shown in FIG. 2, which receives the deflection rolls 3, 3', into a preferably 90°-pivoted changing position, said bearing device has a centering bolt 13 or the like, which is rotatably mounted in an opening 27 (cf. in the detail, FIG. 6) of a receiving plate 28.

Figure 3:
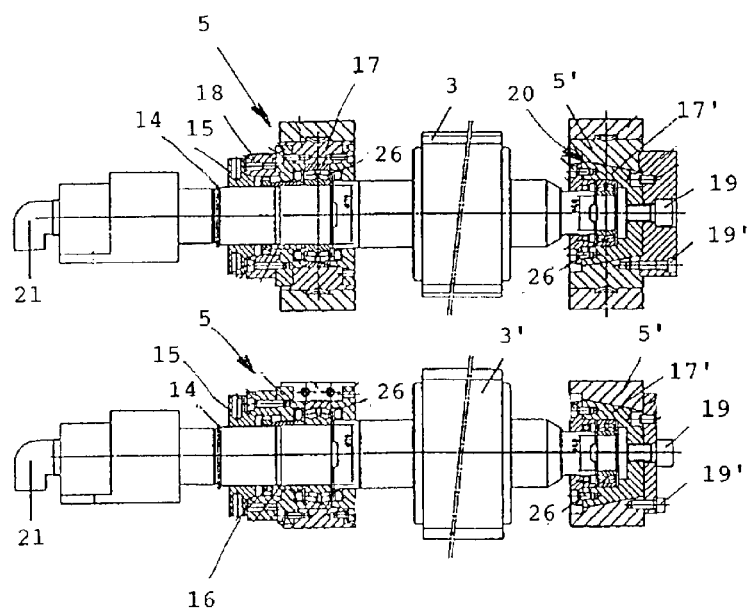
FIG. 3 shows a section along the line III—III in FIG. 1.

FIG. 3 shows particularly clearly that a respective fixing ring 15, mounted displaceably on a shaft axle 14, is provided for fixing of the deflection rolls 3, 3', which fixing ring has a wedge surface 16 which tapers to its free end, so that, when displaced in the direction of a bearing sleeve 18 connected in a rotationally secure manner to a bearing housing 17, it firmly connects the shaft axle 14 or the deflection rolls 3, 3' to the bearing device 5, whilst at the same time performing a centering function.

Once the deflection rolls 3, 3' are thus mounted on one side in a statically defined manner, the pivotable bearing device 5', following the release of fastening screws 19, is able to be pivoted. For the self-centering upon the return swivel of the bearing device 5', the latter has recesses 20, which widen conically towards their inner side and which receive, in positive engagement, bearing housings 17' which are conically tapered in the direction of the free end of the deflection rolls 3, 3'.

In order to allow unhindered pivoting of the bearing device 5', this is disposed on the side facing away from the ports 21 for a liquid or gaseous medium.

Figure 4:
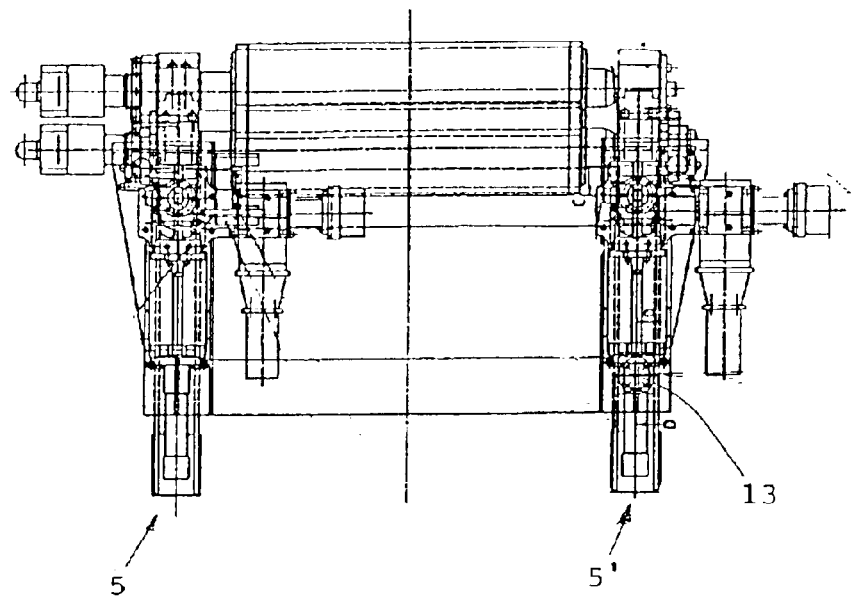
FIG. 4 shows a top view of the device according to FIG. 1.
Figure 5:
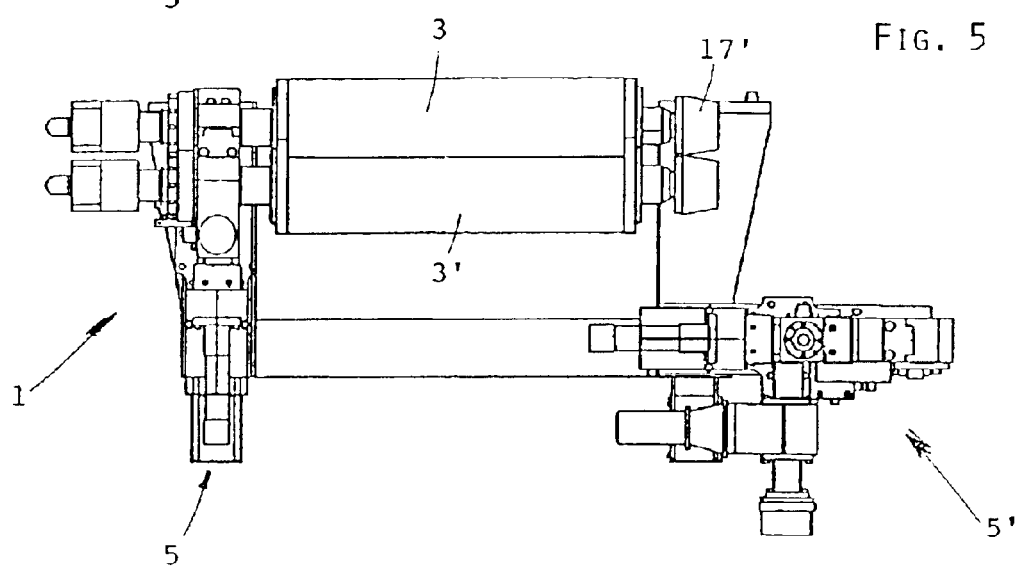
FIG. 5 shows a top view of the device similar to FIG. 4, but with pivoted bearing device.

The top view shown in FIG. 4 also shows the centering bolt 13, about which the entire bearing device 5', following the release of the fastening screws 19, 19', can easily be pivoted, as can especially be seen in FIG. 5. After the bearing device 5' has been pivoted about 90° into the position shown in FIG. 5, unhindered access to the deflection rolls 3, 3' fixed in the bearing device 5 by means of the fixing rings 15 is possible. An exchange of the continuous band 2, which exchange is necessary due to wear phenomena or on account of other surface quality or surface demands, can thereby easily be effected.

For the exchange of the continuous band 2, it is especially favorable if the deflection rolls 3, 3' have previously been brought closer together, thereby reducing the band tension of the continuous band 2 and allowing particularly simple extraction from the deflection rolls 3, 3'. In the illustrative embodiment represented in the drawing, the lower deflection roll 3' is consequently mounted in the stand 6 such that it is displaceable along a guide rail or a slideway.

As a result of the conical design of the bearing sleeves 17', which is tapered in the direction of the free ends, a self-centering alignment of the deflection rolls 3, 3' in the recesses 20 (cf. FIG. 3) of the bearing devices 5' is effected upon the return swivel of the bearing device 5'.

Figure 6:
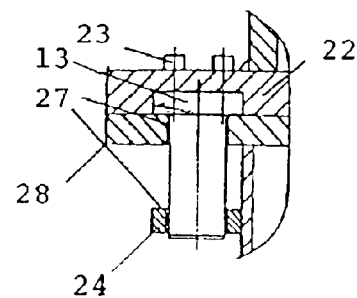
FIG. 6 shows a detailed view of the pivotable bearing of a bearing device.

FIG. 6 shows in detail the pivotable mounting of the bearing device 5' by means of a centering bolt 13, which is rotatably mounted in the opening 27 of a receiving plate 28 of the trolley 11. The centering bolt 13 is in this case connected in a rotationally secure manner to a base plate 22 of the bearing device 5', by means of screws 23. In addition, the centering bolt 13 is led through an opening in a guide plate 24 to achieve stable rotational mounting.

FIG. 7 illustrates the use of a device 1 shown in FIGS. 1 to 5 in a roll frame 10, the continuous band 2 being able to be exchanged once the cylinder 25 has been displaced into a retracted position and the continuous band 2 thus lies prominently at a distance from the roll 9. Disassembly of the trolley 11 from the roll frame 10 for the changing of the continuous belt 2 is therefore unnecessary.

What is claimed is:

1. Device for use in a roll frame for the manufacture of a plastics film, having a continuous band, looped around at least two deflection rolls, for pressing the plastics film against a roll of the roll frame and for cooling the same, the two deflection rolls being rotatably mounted on both sides in lateral bearing devices, characterized in that fastening means are provided for fixing the deflection rolls in a bearing device and the other bearing device is pivotably mounted for the exchange of the continuous band.

2. Device according to claim 1, wherein, as the fastening means for fixing the deflection rolls, a fixing ring having a wedge surface is respectively provided.

3. Device according to claim 1, wherein fixing rings are provided on a side of the device which has ports for a liquid or gaseous medium.

4. Device according claim 1, wherein the bearing device is mounted pivotably about an essentially vertical rotational axis.

5. Device according to claim 4, characterized in that the bearing device is mounted such that it can be pivoted about 90°.

6. Device according to claim 1, wherein, for the pivotable mounting, a centering bolt jutting downwards from the bearing device is provided, which centering bolt is rotatably arranged in a corresponding opening in a receiving plate.

7. Device according to claim 1, wherein the device is provided on a trolley having a plurality of wheels.

8. Device according to claim 1, wherein the pivotable bearing device has conical recesses for receiving conical bearing housings of the deflection rolls.

9. Device according to claim 1, wherein at least one deflection roll is arranged adjustably in the bearing devices.

10. Device according to claim 9, wherein a pneumatic or hydraulic cylinder is provided for the adjustment of the roll position.

11. Device according to claim 9, wherein an electric motor with spindle gearing is provided for the adjustment of the roll position.

12. Device according to claim 9, wherein a stand supporting the two bearing devices is arranged such that it is horizontally and vertically adjustable.

13. Device according to claim 1, wherein at least one deflection roll is driven by a motor.

14. Process for changing a continuous band for pressing a plastics film against a roll and for cooling the same, which is looped at least around two deflection rolls rotatably mounted in lateral bearing devices, characterized in that the deflection rolls are fixed in a bearing device, fastening means of the other bearing device are released and the other bearing device is pivoted, so that the continuous band can be laterally extracted.

15. Process according to claim 14, wherein the mutual distance between the deflection rolls is shortened before the bearing device is pivoted.

16. Process according to claim 14, wherein the deflection rolls in the bearing device are respectively fixed by means of a fixing ring having a wedge surface.

17. Process according to claim 14, wherein the bearing device is pivoted about an axis disposed essentially perpendicular to a receiving plate.

18. Process according to claim 17, wherein the bearing device is pivoted about 90°.

* * * * *